(12) United States Patent
Palmaz

(10) Patent No.: US 11,148,154 B2
(45) Date of Patent: Oct. 19, 2021

(54) SYSTEMS AND METHODS FOR COATING PARTICULATE GOODS IN A FLUID STREAM

(71) Applicant: Bluebonnet Foods, L.P., San Antonio, TX (US)

(72) Inventor: Julio C. Palmaz, Napa, CA (US)

(73) Assignee: Bluebonnet Foods, L.P., San Antonio, TX (US)

( * ) Notice: Subject to any disclaimer, the term of this patent is extended or adjusted under 35 U.S.C. 154(b) by 0 days.

(21) Appl. No.: 16/594,528

(22) Filed: Oct. 7, 2019

(65) Prior Publication Data

US 2021/0101163 A1    Apr. 8, 2021

(51) Int. Cl.

| | | |
|---|---|---|
| *B05B 7/14* | (2006.01) | |
| *B05B 7/10* | (2006.01) | |
| *A23P 20/12* | (2016.01) | |
| *A23G 3/34* | (2006.01) | |
| *B05B 14/10* | (2018.01) | |
| *A23G 3/26* | (2006.01) | |

(52) U.S. Cl.
CPC .......... *B05B 7/1468* (2013.01); *A23G 3/0095* (2013.01); *A23G 3/26* (2013.01); *A23P 20/12* (2016.08); *B05B 14/10* (2018.02)

(58) Field of Classification Search
USPC ....... 118/308, 309, 303, 19–22, 29; 427/180
See application file for complete search history.

(56) References Cited

U.S. PATENT DOCUMENTS

| | | | |
|---|---|---|---|
| 7,614,359 B2 * | 11/2009 | Hasegawa ........... | B05B 13/0257 118/13 |
| 2002/0117108 A1 * | 8/2002 | Pentecost ................... | B01J 2/12 118/303 |

FOREIGN PATENT DOCUMENTS

WO    WO-2011154398 A1 *    12/2011    ............... A23G 3/54

* cited by examiner

*Primary Examiner* — Yewebdar T Tadesse
(74) *Attorney, Agent, or Firm* — David G. Rosenbaum; Rosenbaum IP

(57) ABSTRACT

The present disclosure teaches systems and methods for coating and cooking goods. One system for coating of goods can comprise a source of powder for coating the goods, a source of gas to create a gas stream to carry the powder and the goods in a combined stream through a tunnel or chamber comprising air bearings to keep the goods and the powder from contacting the inner surface of the tunnel or chamber, and a system for recirculating unused powder for reuse. One method for coating goods can comprise combining additive powder with at least one gas stream in a powder circulation chamber and forming a powder gas stream, forming an air bearing on an inner surface of the powder distribution tunnel wherein the powder distribution tunnel comprises an inner tube and outer tube can be separated by a plenum, wherein the air bearing is formed by directing a gas stream through the at least one compressed air inlet causing the tunnel gas stream to form a circular vortex ring having a centrifugal force equal to a pressure gradient outward and releasing goods into the powder distribution tunnel to coat the goods.

12 Claims, 5 Drawing Sheets

SYSTEMS AND METHODS FOR COATING PARTICULATE GOODS IN A FLUID STREAM

BACKGROUND OF THE INVENTION

Figure 1:
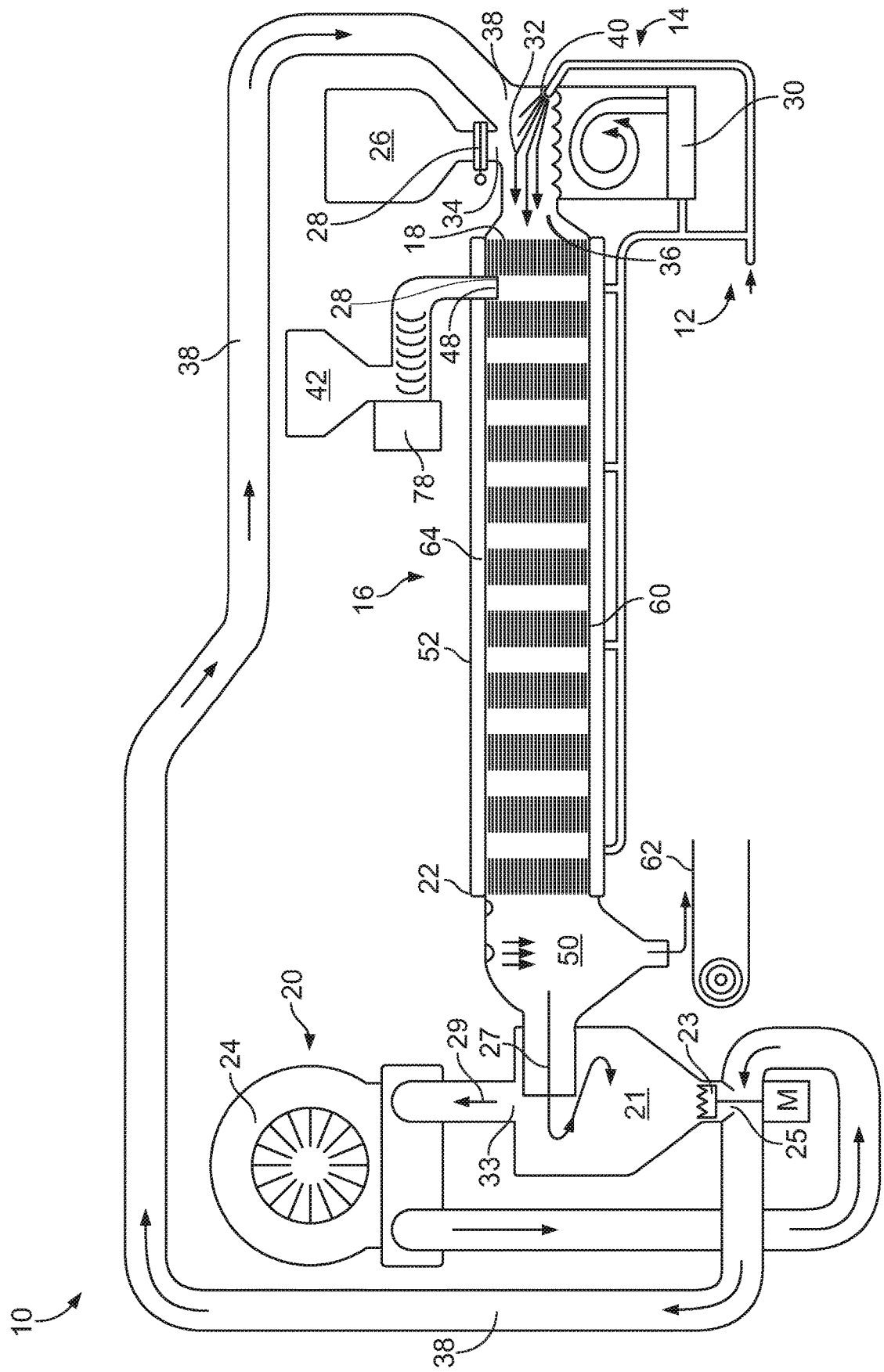

The present invention relates to applying coating to goods. More particularly, the present invention relates to systems and methods for air coating goods wherein both the coating and the goods can be moved by an air stream.

Powdered additives are traditionally applied manually to goods such as comestibles and cosmetics. These additives are traditionally applied in in places such kitchens, processing plants, or lab settings. This process may comprise sprinkling powder on the goods or rubbing powder onto the goods with some amount of pressure to ensure that the powder adheres to the goods.

In commercial manufacturing operations, the process of applying a powder or powdered additives on an assembly line is often burdensome, achieves inconsistent coatings and can cause an overuse or waste of ingredients. Conventional systems and methods have attempted to solve these shortcomings by use of different powder distribution systems.

In one example, comestibles and powder are placed in a rotary drum device and cycled at set speeds for certain time periods to coat the comestibles. While this process is faster than a manual operation, it is difficult to control the consistency of the coating. If multiple goods are placed together for example, a full coating is difficult to achieve. Other shortcomings of this system are that the comestibles and powder impact against the sidewalls of the rotary drum may damage the comestibles, cause frequent need for cleaning the sidewalls of the rotary drum, and result in maintenance and downtime. Any unused powder material left within the rotary drum must be discarded during the cleaning process so as not to contaminate a subsequent process batch.

Another conventional system utilizes a conveyer belt system and air jets to distribute powder onto the comestibles. In these systems, powder additive is sprayed by a gas jet onto comestibles as they travel past the air jet on the conveyor line. A significant disadvantage of the conveyor systems is that they fail to obtain coverage of non-exposed surfaces contacting the conveyor belt system and, therefore, fail to obtain full coverage of the comestibles. Furthermore, the powder additive is also sprayed onto the conveyor resulting in waste and necessitating cleaning and maintenance downtime.

The present invention addresses the shortcomings of the conventional coating systems by providing a gas cycle system that recycles the powder additive within a constant stream flow through which the goods pass and provides for the goods to avoid contact with the machinery surfaces during processing.

SUMMARY OF THE INVENTION

As used herein, the term "powder" is intended to mean a particulate coating material having sufficient size and mass to allow it to be suspended and flow in a gas stream. A powder may be a material that has a relatively finer grain size and a tendency to form clumps when flowing, and it can also be a granular material that is coarser and does not tend to form clumps except when wet. Some examples of powder useful in the present invention include food seasonings, grains, crumbs, flakes, grains, grits, sands, seeds, etc., though this list is not exhaustive or limiting. The particles may be uniform in size or vary in size. The particles may also be homologous or heterologous mixtures of materials.

The present disclosure defines systems and methods for powder coating goods, such as comestibles, cosmetics, pharmaceuticals, clothing, etc. while preserving and reusing powder additives. The powder coating system of the present invention generally comprises two sub-assemblies: a powder circulation assembly and a powder distribution assembly. The powder circulation assembly has a gas inlet and a powder inlet whereby powder released from a powder source into the powder inlet is introduced into a gas stream output from the gas inlet and the gas stream convey the powder into the powder distribution assembly. The powder distribution assembly introduces goods to be coated into the gas and powder stream and circulates the gas, powder and goods to be coated within a chamber while maintaining the goods to be coated and the powder suspended in a gas flow within the chamber such that the goods to be coated do not substantially impact against the sides of the chamber. The goods to be coated are coated with the powder in the air flow within the powder distribution assembly and coated goods are fed to an outlet and conveyed away for further processing, such as freezing and packing. An optional powder recirculation assembly may be operably coupled to the output of the powder distribution assembly to allow for recirculation and reuse of unused powder coating.

In one aspect, the powder distribution system may comprise air or an inert gas source, hereby named "gas," conduits coupling the gas source to a gas inlet and a powder reservoir having a powder outlet in communication with the gas inlet. The gas inlet directs the gas into a gas stream distribution source, such as a pressurized source. The gas stream distribution source drives a gas stream into the powder circulation assembly and combines with powder from a powder reservoir and a gas stream driven by the powder recirculation assembly to form a powder gas stream flowing in the direction of the powder distribution assembly. In these embodiments, the powder distribution assembly comprises an inner tube and outer tube concentrically aligned and separated by a plenum. As one example, the inner tube may comprise a plurality of slots disposed tangential to the bore of the inner tube. While the powder/gas stream is being driven into the powder distribution assembly, a gas stream distribution source, such as a compressor, drives air through the outer tube, through the plenum and through the plurality of slots to form an air bearing on the inner surface of the inner tube.

Goods, such as comestibles, cosmetics, clothing, pharmaceuticals, or any other good that can be moved by a gas stream are released into the powder distribution assembly and coated by the powder/gas stream as well as carried by the powder/gas stream to an output end of the distribution assembly. The gas substantially prevents powder and goods from touching the inner surface of the inner tube by forming a gas bearing or vortex ring. Once the coated goods reach the output end of the powder distribution assembly, the coated goods are separated out of the powder gas stream, and the powder gas stream can be directed to the powder recirculation assembly where the powder is dried, ground, and recirculated through a blower, that can be a centrifugal air blower, or compressor back to the powder circulation assembly.

In one aspect of the invention, the powder distribution assembly may comprise a goods detection sensor at the output end that, upon detecting at least one good, relays a signal to a control system that triggers an air jet or a separation member to separate the coated good from the powder gas stream.

In another aspect of the invention, the powder distribution assembly may be aligned horizontal, vertical, or at an angle to control the progression speed of the goods moving there through.

In yet another aspect of the invention, the inner tube portion may comprise a fluid spray. The fluid spray may be a heat transfer medium, texture enhancer, and/or a flavor enhancer, such as an oil spray. The inner tube portion may also incorporate radiant heat configured to coat and cook the goods, if cooking the goods or heating the goods to a certain temperature is needed to create the finished product. For example, the radiant heat may cook comestibles in an environment configured to retard or eliminate the risk of the fluid spray oxidizing, such as in a low oxygen (i.e., nitrogen) environment. The environment can comprise oxygen content lower than ambient air, which would reduce the risk of the fluid spray oxidizing. The goods can be cooked or heated to a desired temperature as they travel through the powder distribution tunnel.

The present disclosure further incorporates a method for coating goods and preserving unattached additive powder comprising the following steps: combining additive powder with at least one gas stream in a powder circulation chamber and forming a powder gas stream; directing the powder gas stream to a powder distribution tunnel coupled to the powder circulation chamber, forming a gas bearing on an inner surface of the powder distribution tunnel wherein the powder distribution tunnel comprises an inner tube having a plurality of passageways tangential to a central bore of the inner tube, the inner tube concentrically surrounded by an outer tube having at least one compressed gas inlet, the inner tube and outer tube being separated by a plenum, wherein the air bearing is directing a tunnel gas stream through the at least one compressed gas inlet and through the plurality of slots causing the tunnel gas stream to form a circular vortex ring having a centrifugal force equal to an outward pressure gradient, releasing goods into the powder distribution tunnel; coating the goods with the powder in the gas stream as the powder gas stream carries the goods to a output end of the powder distribution tunnel, separating the coated goods from the powder gas stream; directing the powder stream to a recirculation chamber, drying and grinding the powder; and recirculating the powder through a recirculated powder stream via a blower coupled to the powder circulation chamber.

Another aspect of the method may comprise coating the goods in fluid spray, such as oil or other fluid that can transfer heat, enhance flavor, and/or enhance the texture of the goods.

Another aspect of the method may comprise applying heat from a heat source, such as a radiant heat source, within the powder distribution tunnel thereby cooking or heating the goods as the goods traverse the powder distribution tunnel. The goods may be coated with the fluid spray before they are heated or cooked.

Another aspect of the method may comprise the steps of adjusting the travel speed of the goods within the powder distribution tunnel by adjusting the angle at which the powder distribution tunnel is disposed.

Another aspect of the invention relates to the use of an inert gas or mixture of gasses to diminish oxidation of the food, oils and particulates. The gas or gas mixture is recirculated and replenished to compensate losses through entry and exit ports. The gas can be nitrogen, argon, helium or carbon dioxide or any other inert gas that would not chemically interact with the food components.

The term "assembly" in this specification is meant to define and group components that are related in various aspects of the system, the term is not meant to confine individual components to actual physical assemblies as manufactured.

The methods and systems are set forth in part in the description which follows, and in part will be obvious from the description, or can be learned by the practice of the methods and systems. The advantages of the methods and systems will be realized and attained by means of elements and combinations particularly pointed out in the appended claims. It is to be understood that both the foregoing general description and the following detailed description are exemplary and explanatory only and are not restrictive of the methods and systems, as claimed. More details concerning these embodiments, and others, are further described in the following figures and detailed description set forth herein below.

BRIEF DESCRIPTION OF THE DRAWINGS

In the accompanying figures, like elements are identified by like reference numerals among the preferred embodiments of the present invention;

FIG. 1 illustrates one example embodiment of the powder coating system of the present invention.

FIG. 2 illustrates one example embodiment of an initial powder circulation portion of the powder coating system.

FIG. 3A illustrates one longitudinal cross sectional example embodiment of a powder distribution portion of the powder coating system shown in FIG. 1.

FIG. 3B illustrates one example embodiment of a cross-section of a tunnel portion of the powder coating system shown in FIG. 1.

FIG. 4 illustrates another example embodiment of a powder coating system.

DETAILED DESCRIPTION OF THE PREFERRED EMBODIMENTS

This application is intended to cover any variations, uses or adaptations of the invention following, in general, the principles of the invention, and including such. The foregoing and other features and advantages of the invention will become more apparent from the following detailed description of the exemplary embodiments, read in conjunction with the accompanying drawings. The detailed description and drawings are merely illustrative of the invention rather than limiting, the scope of the invention being defined by the appended claims and equivalents thereof For purposes of clarity, the following terms used in this patent application will have the following meanings:

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence a stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged," "connected," or "coupled" to or with another element, it may be directly on, engaged, connected or coupled to the other element or layer, or intervening elements or layers may be present. In contrast, when an element is referred to as being "directly on," "directly engaged to," "directly connected to," or "directly coupled to" or with another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

"Substantially" is intended to mean a quantity, property, or value that is present to a great or significant extent and less than, more than or equal to totally. For example, substantially vertical may bean less than greater than or equal to completely vertical.

"About" is intended to mean a quantity, property, or value that is present at ±10%. Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

FIG. 1 illustrates one example embodiment of the powder coating system 10 of the present invention. The powder coating system 10 generally comprises a compressed air blower assembly 12, coupled to a powder circulation assembly 14 and a powder distribution assembly 16, the powder distribution assembly 16 coupled to the powder circulation assembly 14 at a first end 18 and can optionally be a coupled to an optional recirculation assembly 20 at a second end 22, the optional recirculation assembly 20 is shown and is further coupled to the powder circulation assembly 14, forming a looped system.

The compressed air blower assembly 12 can be used to provide any mix of gas/air that best works with the goods to be coated. For instance, if comestibles are the goods to be coated, it may be that a low oxygen air/gas mixture is needed. One having ordinary skill in the art will know how to create the air/gas mixture needed to coat a good using the systems and methods disclosed herein.

The optional recirculation assembly 20 comprises a recirculation air source, such as a blower 24, which provides a recirculated gas stream for recirculating an unused portion of the dispersed powder after the goods and powder have been combined in the powder distribution assembly 16. The powder circulation assembly 14 can include a powder reservoir 26 to hold the powder that is to be distributed. The powder held in the powder reservoir 26 can be a heterogeneous or homologous mixture of materials that have the same or different shape and size grains.

The powder circulation assembly 14 may comprise a gas stream distribution source dispersing a first gas stream from the compressed air blower assembly 12 and recirculated gas stream source, such as blower 24, dispersing a recirculated gas stream, combined into a single stream, if the optional recirculation assembly 20 is employed in the powder coating system 10.

The powder reservoir 26 is coupled to the powder circulation assembly 14 though a powder reservoir valve or covering device 28 that can be opened to allow the desired amount of powder be dispersed or flow to the powder circulation assembly 14, and closed to stop the flow of powder into the powder circulation assembly 14. A hopper 30 can be positioned below the powder reservoir 26 to catch any powder that is not initially blown into, or is unused by, the powder distribution assembly 16.

Turning now to the optional recirculation assembly 20, it will be seen to comprise a powder collection chamber 21, a grinder 23, and blower 24. The powder collection chamber 21 comprises an air recirculation opening 25 disposed at a bottom portion of the powder collection chamber 21 and coupled to the blower 24, a powder gas stream inlet 27 disposed on first side of the powder collection chamber 21 and coupled to the recirculation opening 33 of the powder distribution assembly 16, an air recirculation exit 29 disposed at the top of the powder collection chamber 21 and coupled to the blower 24, a powder recirculation exit 31 disposed at the bottom of the powder collection chamber 21 adjacent to the recirculation opening 33, and the grinder 23 disposed between a recirculation opening 33 and the powder recirculation exit 31. The grinder 23 can be configured to grind corrugated powder to reduce the size of the grains of powder.

The powder collection chamber 21 collects any powder that is unused and did not coat the goods as the goods and powder traveled through the powder distribution assembly 16.

In operation, the remaining powder gas stream travels into the powder collection chamber 21. At this point in the cycle some of the powder may be wet or clustered from previous operations. The grinder 23 is activated to break down larger powder particles and filter the larger particles into the powder recirculation exit. During this process, the blower 24 circulates air into the powder collection chamber 21 and out both the air recirculation exit 29 and the powder recirculation exit 31. The air circulated from the blower 24 helps to dry the powder from previous operations, and creates a refined powder gas stream that is then circulated back for reuse.

Figure 2:
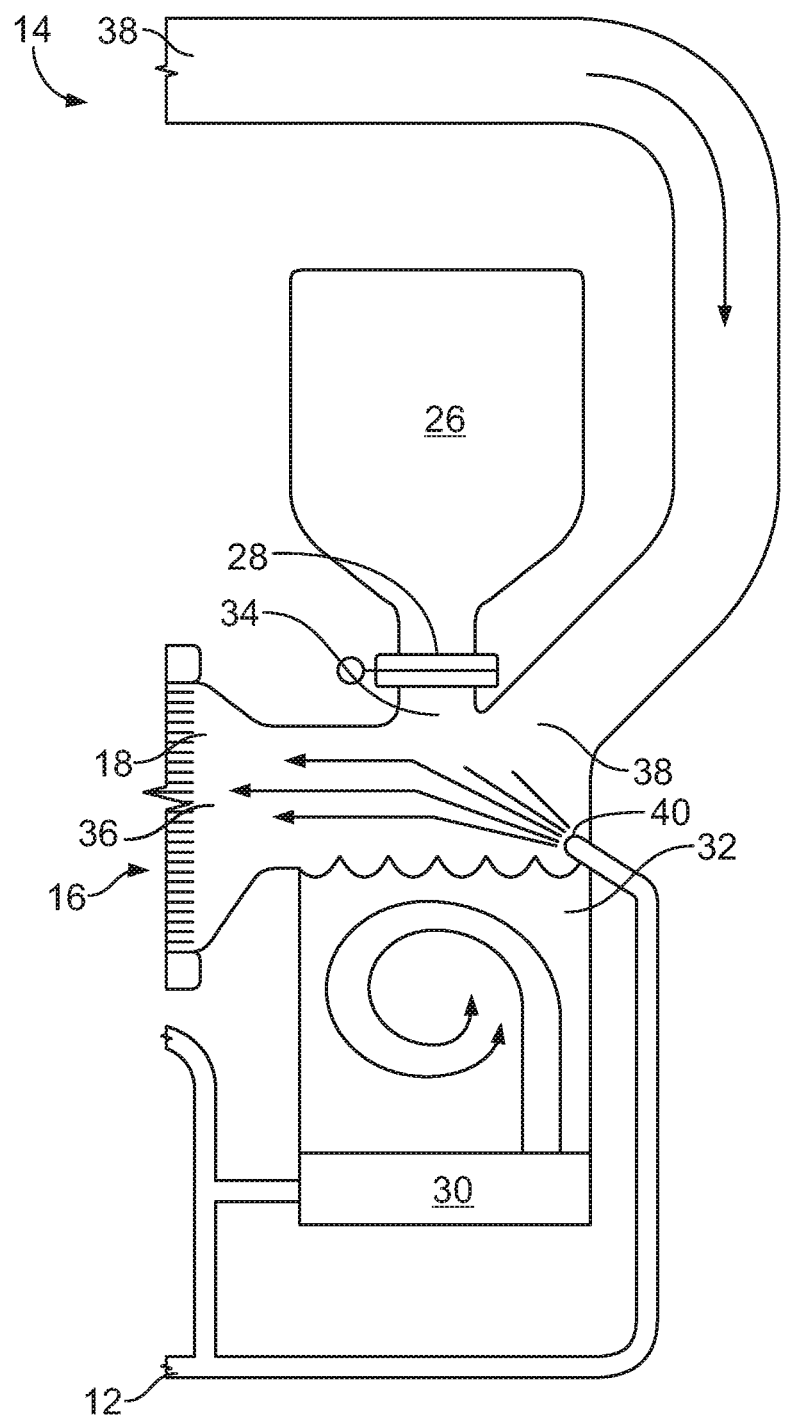

Turning to FIG. 2, one embodiment of the powder circulation assembly 14 is illustrated and comprises a powder reservoir 26 and a powder circulation chamber 32. The powder reservoir 26 is configured to hold and distribute the powder. The powder can be distributed through a channel, such as a tapered channel, and the powder is distributed through the powder distribution opening 34 disposed at the bottom of the powder reservoir 26. In some embodiments, the powder reservoir may comprise a powder reservoir valve or covering device 28 disposed over the powder distribution opening 34 to regulate the powder flow rate. The powder reservoir 26 is coupled to the powder circulation chamber 32 at the powder distribution opening 34 of the powder reservoir 26 (which may comprise a powder reservoir valve or covering device 28). The powder circulation chamber 32 is coupled to the powder distribution opening 34.

The powder circulation chamber 32 further comprises a powder distribution channel opening 36 coupled to the powder distribution assembly 16, a recirculation opening 38 coupled to the optional recirculation assembly 20, a compressed gas inlet 40 beneath the recirculation opening 38.

In some embodiments the powder distribution tunnel 44 comprises an outer tube 52 and an inner tube 60. The inner tube 60 can comprise the recirculation opening 38 at a first end 18 coupled to the powder distribution opening 34 of the powder circulation chamber 32 and a powder gas stream exit opening disposed at second end of the powder distribution tunnel 55. In some embodiments the powder distribution tunnel 44 is aligned horizontal, while in other embodiments the powder distribution tunnel 44 is aligned vertical or at an angle in between to control the speed of travel of goods to be coated therethrough.

In operation, airflow flowing from the optional recirculation assembly 20 through the recirculation opening 38 combines to form a gas stream with gas flowing in the same direction from the compressor/blower assembly 12 through the compressed gas inlet 40 toward the powder distribution channel opening 36. When powder is distributed through the powder distribution opening 34, the powder combines with the gas stream and flows through the powder distribution channel opening 36 into the powder distribution assembly 16. At the same time, the gas stream created by the gas flowing from the blower assembly 12 forms a circular stream catching any powder that may have fallen beneath the distribution stream, and circulates it back into the distribution stream.

In operation the powder gas stream flows from the powder circulation assembly 14 through the powder gas stream entrance opening 36 along the longitudinal axis of the powder distribution opening 34, at the same time, goods are distributed from the goods reservoir 42 into the inner tube 60 and the goods are coated by and moved along the powder gas stream in a direction parallel to the longitudinal axis of the powder distribution tunnel 44 into the separation chamber 50. Concurrently, the blower assembly 12 disperses gas through the at least one compressed gas tunnel opening 70 into the plenum 64 and through the plurality of slots 72.

Figure 3A:
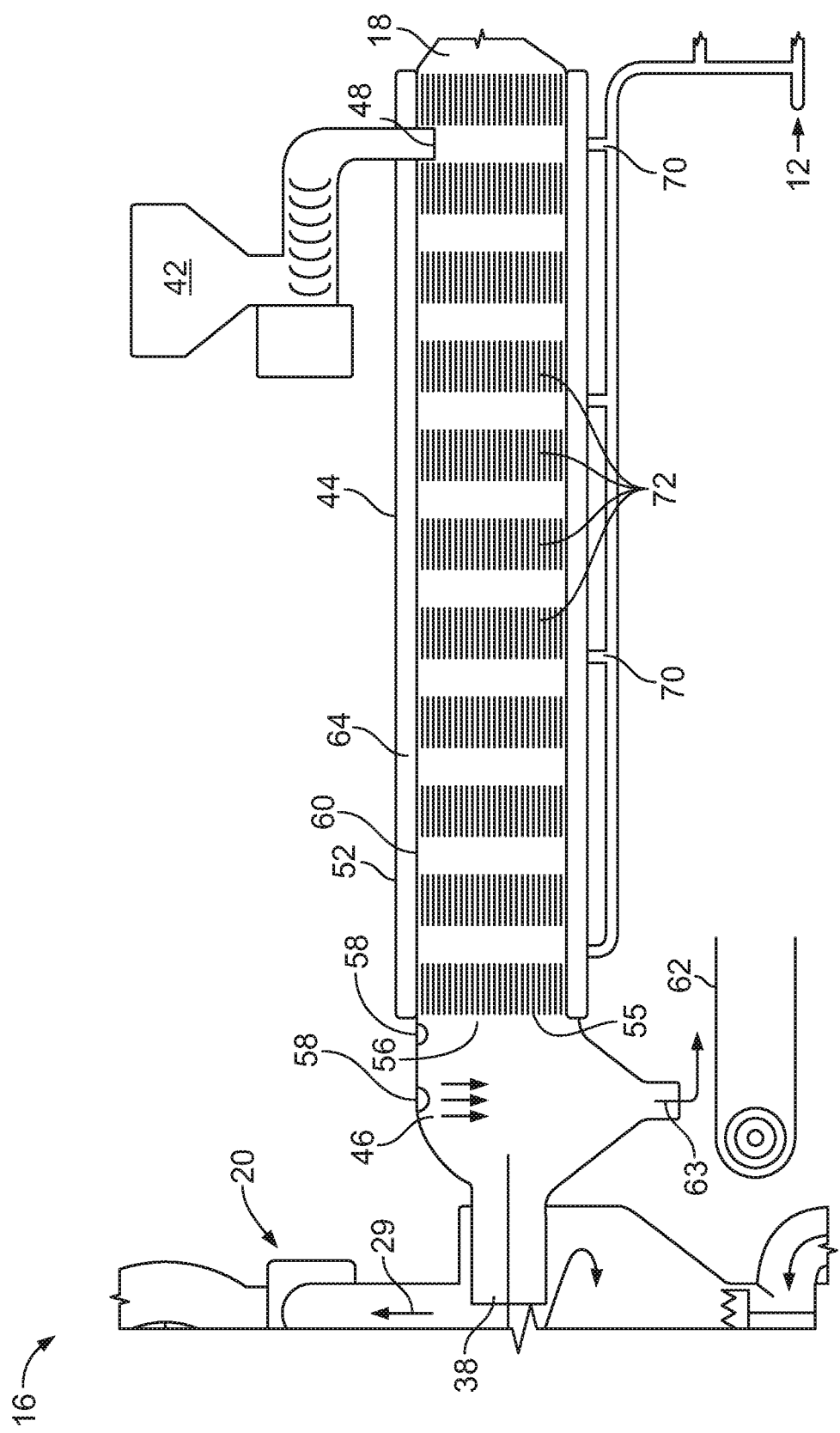

Turning to FIG. 3A, the powder distribution assembly 16 is illustrated and comprises a goods reservoir 42, a powder distribution tunnel 44, and a separation chamber 50. The goods reservoir 42 is configured to hold goods and distribute the goods distribution opening 48 of disposed at the bottom of the goods reservoir 42. In some embodiments, the goods reservoir 42 may comprise a valve or covering device 28 disposed over the goods distribution opening 48 configured to regulate the goods flow rate. The goods reservoir 42 is coupled to the powder circulation assembly 14 at the goods distribution opening 48.

Figure 3B:
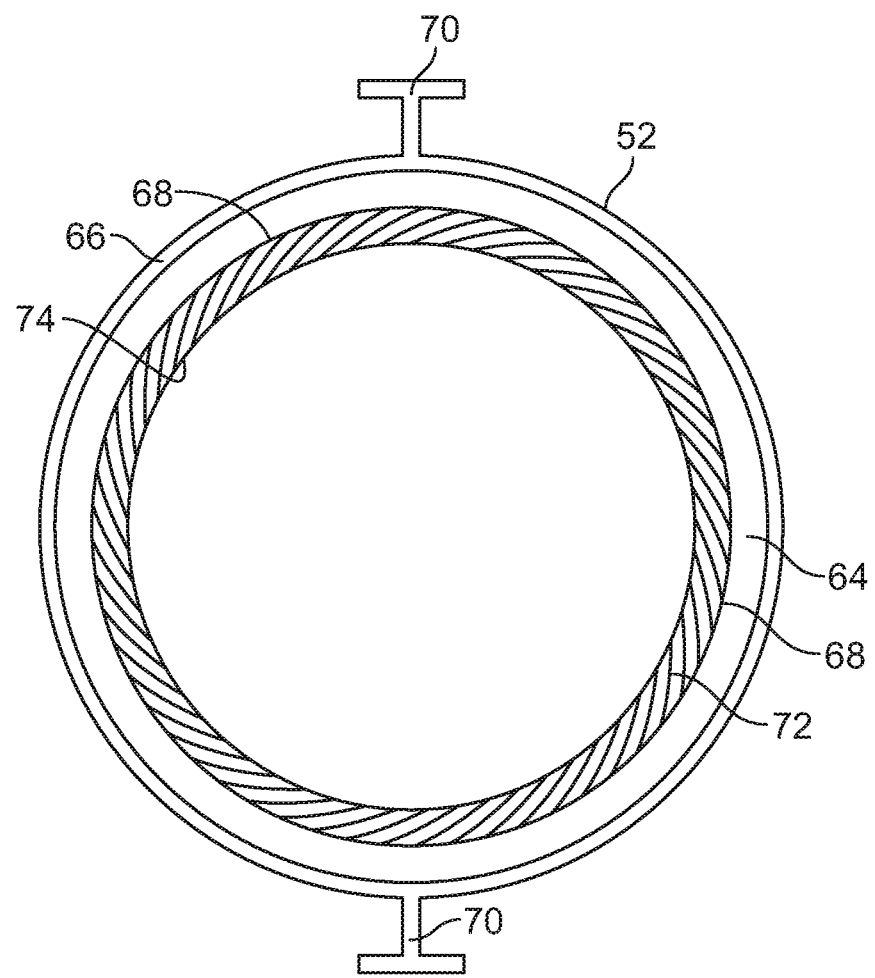

The powder distribution tunnel 44 is illustrated in FIGS. 3A and 3B and can be configured to separate the coated goods from the gas/powder stream. In some embodiments the separation chamber 50 may be an extension of the outer tube 52 or inner tube 60. The powder distribution tunnel 44 comprises a coated goods reception opening 56, a recirculation opening 33, a goods detection sensor 58, and a triggered air jet 46. The powder distribution tunnel 44 is coupled at a first end 18 to the powder distribution tunnel at the coated goods reception opening 56 while coupled at a second end to the optional recirculation assembly 20. The goods detection sensor 58 is disposed proximal the coated goods reception opening 56 and is configured to detect when goods pass through the coated goods reception opening 56 into the separation chamber 50. The goods detection sensor 58 may comprise an optical sensor calibrated to detect goods of a certain size. The triggered air jet 46 can be coupled to goods detection sensor 58 through a control system.

In operation, the gas/powder stream carrying coated goods flows from the powder distribution assembly 16 into the separation chamber 50. The goods detection sensor 58 detects the presence of goods within the air stream and through the control system triggers the air jet 46 to disperse an air stream normal to the gas/powder stream forcing the goods out of the gas/powder stream and into an additional hopper (not shown) or onto a conveyer belt 62 through a coated goods collection end 63. The remaining gas/powder stream can enter the optional recirculation assembly 20, if it is incorporated into the system, to be dried, ground and recirculated back into the powder coating system 10 (shown in FIG. 1).

Adding in the illustration in FIG. 3B, powder distribution tunnel 44 is illustrated and comprises an outer tube 52 and inner tube 60. The outer tube 52 concentrically surrounds the inner tube 60 and forms a plenum 64 bounded by an outer tube inner surface 66 and an inner tube outer surface 68. The outer tube 52 additionally comprises at least one compressed gas tunnel opening 70 coupled to the compressed air blower assembly 12 (shown in FIG. 1).

As further shown, the inner tube 60 can comprise a plurality of slots 72 tangential to the central bore of the inner tube 60 passing through the inner and outer tube inner surface 66 and the inner tube outer surface 68.

The plurality of slots 72 can be further dimensioned such that, as air passes through, the air forms a circular vortex ring along the inner tube inner surface 74 of the inner tube 60 having a centrifugal force equal to the outward pressure gradient. This results in what amounts to a gas bearing forming along the inner tube inner surface 74. The air bearing along the inner tube inner surface 74 prevents any goods piece or powder moving along the inner tube 60 by the powder gas stream from touching the inner tube inner surface 74 as it flows into the separation chamber 50. The slots may have variable pitch relative to the longitudinal axis of the tunnel to vary the speed of rotation of the bearing. Alternatively, the direction the pitch may alternate in the clockwise or counterclockwise direction to cancel or slow down induced spinning motion of the particles if so desired. The shape of the slots may vary from a circular or square section channel to a slot of variable aspect ratio to obtain the desired gas bearing effect in the tunnel lumen. The tunnel may be formed of a single piece or multiple pieces to facilitate assembly and servicing. Each section may comprise one or more gas channel arrangements and may assemble with each other by conical fitting, threads or other mechanical coupling arrangements.

In another embodiment, the inner tube 60 or the goods reservoir 42 may incorporate a fluid spray, such as an oil spray, and/or a radiant heat source configured to coat the goods with a fluid and/or cook the goods in a nitrogen environment as the goods travel through the powder distribution opening 34.

Figure 4:
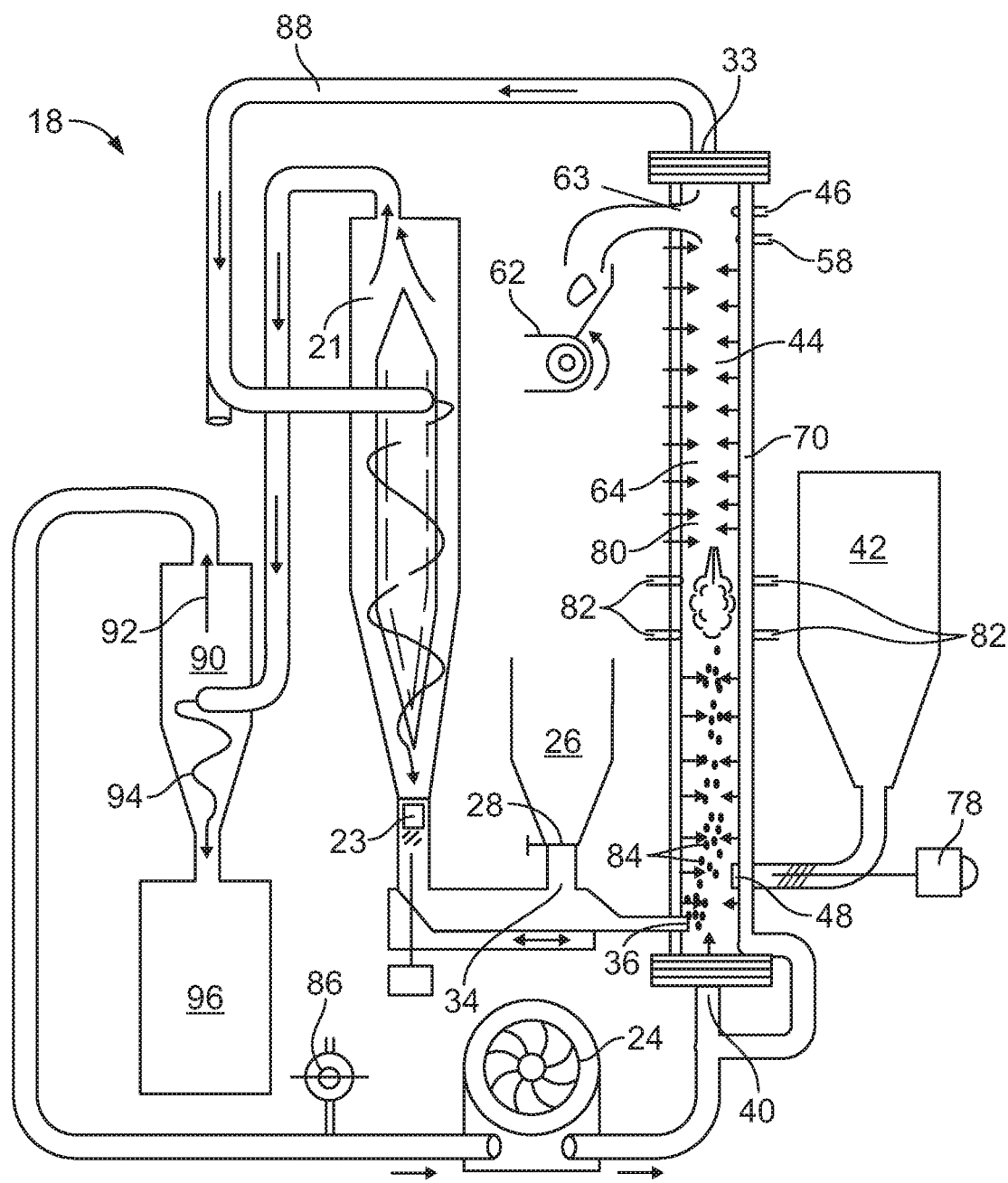

Turning now to FIG. 4, a slightly modified embodiment of the powder coating system 10 of the present invention. Like structures are numbered the same as in the previous embodiment. The difference in this embodiment is seen to comprise the inclusion of the turbo cooking capability in a primarily, low oxygen atmosphere as discussed hereinabove. There is provided herein goods reservoir 42 from which the goods can be fed by a gear reduction stepper motor 78 into a heating element 80 with a powder 84 being dispensed from a powder reservoir 26 which may comprise a reservoir valve or covering device 28 for controlling the flow of the powder 84 into the powder distribution assembly 16 and passed into the heating element 80.

Along a length of the heating element 80 are provided fluid jet openings 82 through which a fluid jet that provides a fluid spray, such as oil, fluid marinades, or other fluid additives, that may be applied to goods by spraying the fluid onto the goods to be coated that are dispensed into the powder distribution assembly 16 from good reservoir 42 and cooked by the heating element 80. The second end 22 of the powder distribution assembly 16 may also comprise an goods detection sensor 58, such as an optical sensor, for sensing goods passing thereby and can further comprise a gas jet 86 for injection of a gas, which can be nitrogen, into the powder distribution assembly 18 as needed, controlled by a control system (not shown) which monitors and adjusts parameters for optimum performance. The various parameters sensed and controlled comprise temperature, humidity, pressure, and oxygen content, all of which may be controlled manually or by the control system (not shown). A gas stream/powder mix is then shunted to powder recovery line 88 which incorporates a powder collection chamber 21. The gas stream/powder mix is then separated into a gas stream/gas stream which is fed to a separator 90 which sends a clean air/gas stream 92 back into the powder coating system 10 for reuse and the used powder into a second stream 94 which is contained in tank 96 for decontamination or removal.

Those of ordinary skill in the art will understand and appreciate the foregoing description of the invention has been made with reference to certain exemplary embodiments of the invention, which describe systems and methods of use. Those of skill in the art will understand that obvious variations in construction, material, dimensions or properties may be made without departing from the scope of the invention which is intended to be limited only by the claims appended hereto.

The invention claimed is:

1. A system for coating goods with a gas/powder mixture comprising:
    a process chamber having an ingress end and an egress end, an inner tube and an outer tube concentrically surrounding the inner tube and defining a pressurized gas plenum therebetween, wherein the inner tube further includes a plurality of slots passing through the inner tube and communicating with a central bore of the inner tube;
    a working gas source and a working gas, the working gas source being in communication with the ingress end of the process chamber and configured to communicate a working gas stream into the pressurized gas plenum and then into the central bore of the inner tube of process chamber;
    a source of coating powder in communication with the process chamber and configured to release coating powder into a flow of the working gas into the pressurized gas plenum;
    a source of a goods to be coated in communication with central bore of the inner tube of the process chamber and configured to release the goods to be coated into the flow of the working gas;
    wherein the working gas stream is introduced into the pressurized gas plenum and through the plurality of slots in the inner tube at a flow rate and pressure sufficient to create an air bearing of the working gas stream within the process chamber such that both the coating powder and the goods to be coated are suspended in the working gas stream along a substantial length of the process chamber without substantially contacting the inner tube; and
    a recapture port at the egress end of the process chamber configured to recapture coating powder that is suspended in the working gas stream at the recapture port.

2. The system of claim 1, further comprising a powder circulation chamber.

3. The system of claim 1, further comprising a working gas recirculation pump in communication with the egress end of the process chamber and with a working gas recirculation inlet at the ingress end of the process chamber.

4. The system of claim 3, wherein a powder circulation chamber is operably coupled in communication with the working gas source and the working as recirculation inlet.

5. The system of claim 1, wherein the goods to be coated comprise particulate comestibles.

6. The system of claim 5, wherein the particulate comestibles are precooked prior to being introduced to the source of the goods to be coated.

7. The system of claim 5, further comprising a cooking fluid applicator in fluid flow communication with the pressurized gas plenum.

8. The system of claim 1, further comprising a separation chamber operably coupled to the egress end of the process chamber, the separation chamber being configured to separate powder coated goods from uncoated powder and convey the uncoated powder to the ingress end of the process chamber.

9. The system of claim 8, wherein the uncoated powder is combined with coating powder from the source of coating powder at the ingress end of the process chamber.

10. The system of claim 1, wherein the process chamber has a substantially horizontal orientation.

11. The system of claim 1, wherein the process chamber has a substantially vertical orientation.

12. The system of claim 1 wherein the plurality of slots are configured such that when a gas stream passes through the plurality of slots the air bearing is formed as circular vortex ring a centrifugal force equal to a pressure gradient outward on an inner surface of the inner tube.

* * * * *